United States Patent Office 3,156,718
Patented Nov. 10, 1964

3,156,718
PROCESS FOR PREPARING THIOPHOSPHORIC, THIOPHOSPHONIC, AND THIOPHOSPHINIC ACID ESTERS
Walter Lorenz, Wuppertal-Vohwinkel, and Gerhard Schrader, Wuppertal-Cronenberg, Germany, assignors to Farbenfabriken Bayer Aktiengesellschaft, Leverkusen, Germany, a corporation of Germany
No Drawing. Continuation of application Ser. No. 103,192, Apr. 17, 1961. This application Nov. 21, 1962, Ser. No. 239,361
Claims priority, application Germany Apr. 16, 1960
10 Claims. (Cl. 260—461)

The present invention relates to and has as its objects a new and useful process for the production of thiophosphoric, -phosphonic or -phosphinic acid esters, especially of such compounds of the aforesaid type being of importance as pesticides in the agricultural and hygienic field.

This application is a continuation application of our copending application Serial No. 103,192, filed April 17, 1961, and now abandoned.

The reaction products of alkyl halides with sodium thiosulfate (thiosulfonic acid monoester) as it is known readily react with dithiophosphoric acid derivatives according to the following scheme:

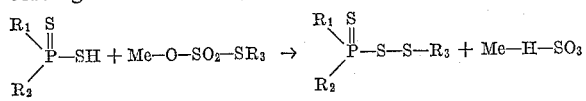

$R_1$, $R_2$ and $R_3$ are organic radicals.

This reaction is the object of copending application Serial No. 88,027, now U.S. 3,035,082, filed February 9, 1961.

During further investigation of this reaction and in accordance with this invention it was found that, in general, salts of thiosulfonic acid monoesters react with salts of phosphites, thiolphosphites, phosphonites, thiophosphonites, phosphinites and thiolphosphinites so as to form thiolesters of phosphoric acid, phosphonic acid, or phosphinic acid or their thiono-analogues respectively. The following general equation may illustrate this:

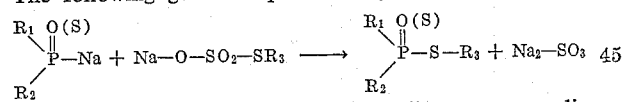

In these formulae $R_1$ and $R_2$ denote alkoxy groups, aliphatic or aromatic residues; $R_1$ and $R_2$ may be the same or different; $R_3$ denotes an optionally substituted, alkyl or aralkyl residue; Me denotes a univalent metal residue, particularly an alkali metal or the ammonium radical.

The above described new reaction already takes place at room temperature, and generally proceeds exothermically. It is not necessary to start from the alkali salts of the phosphites, phosphonites or phosphinites, but rather these salts may be formed during the reaction, by adding acid-binding agents. Solvents and diluents which have proved particularly suitable for carrying out the reaction are those with a strongly polar character, such as, e.g., alcohols or even water.

The reaction as described is capable of being widely employed, so that also a large number of previously unknown phosphoric, phosphonic and phosphinic acid thiolesters can be obtained. Known compounds moreover may be prepared in an easy and economical way.

The following examples may illustrate the present invention.

Example 1

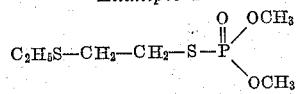

224 grams (1 mol) of 2-ethylmercaptoethyl-thiosulfonic acid sodium salt and 132 grams (1.2 mols) of dimethyl phosphite are dissolved in 224 ml. of methanol. After addition of 500 ml. of benzene, the amount of sodium methylate corresponding to 1.25 mols of sodium is added dropwise at 0–5° C. during the course of 1 hour. After introduction of the calculated amount of sodium methylate, the reaction product has a practically neutral reaction. The separated sodium sulfite is dissolved with 1.5 litres of water and separated, the product is washed neutral with a little water, dried over sodium sulfate, and the solvent is distilled off. There are obtained 114 grams of the ester as a pale yellow, almost odorless oil which exhibits a boiling point of 75–76° C./0.01 mm. Hg; $n_D^{24}$ 1.5081. Yield 49.5% of the theoretical.

Calculated for molecular weight 230.3: S, 27.84%; P, 13.45%. Found: S, 28.81%; P, 12.98%.

Example 2

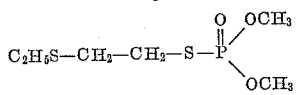

125 grams (1 mol) of 2-ethylmercaptoethyl chloride and 257 grams (1.04 mols) of sodium thiosulfate are warmed to 70° C. in 160 ml. of water and 160 ml. of methanol for 15 minutes. After a short while, the ethyl chloride dissolves whilst sodium chloride separates. The solution is cooled to 0–5° C., 132 grams (1.2 mols) of dimethylphosphite and 500 ml. of benzene or methylene chloride are added, and a solution of 1.25 mols of caustic soda in 150 ml. of water is added dropwise at this temperature. At the end, the solution is just alkaline towards phenolphthalein. It is stirred at room temperature for another 30 minutes, the sodium sulfite is filtered off by suction and separated, the product is washed neutral with water, and dried over sodium sulfate. After the solvent has been distilled off, there are obtained 87.5 grams of the ester as an almost colorless oil. $n_D^{22}$ 1.5085. Yield 38% of the theoretical.

Example 3

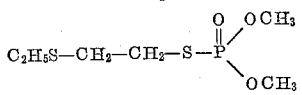

68 grams (0.3 mol) of 2-ethylmercaptoethyl-thiosulfonic acid sodium salt and 37 grams (0.33 mol) of dimethylphosphite are dissolved in 100 ml. of water, and the solution is treated with a few drops of phenolphthalein solution. After the addition of 250 ml. of benzene, a solution of 13.5 grams of caustic soda in 110 ml. of water is added dropwise with cooling so that the temperature is maintained at 5–10° C. The solution is weakly alkaline to phenolphthalein. The mixture is stirred at room temperature for another 30 minutes, the sodium sulfite is filtered off by suction and separated, the product is washed neutral with water, dried over sodium sulfate, and the solvent is distilled off. By this method, there are obtained 24 grams of the ester, as a colorless and odorless oil which distils at 70–72° C. under a pressure of 0.01 mm. Hg; $n_D^{22}$ 1.5087. Yield 35.7% of the theoretical.

Calculated for molecular weight 230.3: S, 27.84%; P, 13.45%. Found: S, 28.52%; P, 13.03%.

Example 4

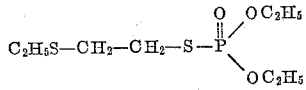

68 grams (0.3 mol) of 2-ethylmercaptoethyl-thiosulfonic acid sodium salt are dissolved in 150 ml. of methanol and treated with 46 grams (0.33 mol) of diethyl phosphite. The amount of sodium ethylate corresponding to 0.33 mol of sodium is added dropwise at 5–10° C. whilst cooling with ice-water. Sodium sulfite already separates at the beginning, and at the end of the solution sets solid to a salt pulp. 250 ml. of benzene are added, and the salts are dissolved in 1 litre of water. After separation, the benzene solution is dried with sodium sulfate, and the solvent is distilled off. By this method, 30 grams of the ester are obtained as a practically colorless oil. Yield 38.8% of the theoretical.

*Example 4a*

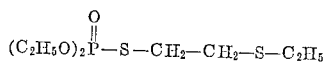

46 grams (0.33 mol) of O,O-diethylphosphorous acid are added dropwise to a solution of 74 grams (0.33 mol) of sodium 2-ethylmercaptoethyl-thiosulfate in 150 cc. of water, the mixture is thereafter cooled to 10° C. and treated dropwise at 10–15° C. whilst cooling with 42 grams (0.4 mol) of triethylamine. After the addition has been completed, external cooling is removed, and the reaction mixture is left alone for an hour to complete the reaction. During this process, the temperature of the mixture slowly rises to 25° C. and the reaction product separates in the form of an oil at that time. The mixture is neutralized to a pH value of 6, and it is repeatedly extracted with methylene chloride. After drying the methylene chloride solution over sodium sulfate, the solvent is distilled off. There is obtained the O,O-diethyl-S-2-(ethylmercaptoethyl)-thiolphosphoric acid ester as a colorless oil. $n_D^{20}$ 1.5088. Yield: 82 grams, corresponding to 96.4% of the theoretical.

*Example 5*

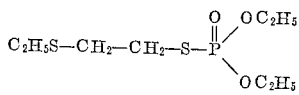

68 grams (0.3 mol) of 2-ethylmercaptoethyl-thiosulfonic acid sodium salt are dissolved in 150 ml. of water. After the addition of 46 grams (0.33 mol) of diethyl phosphite and a few drops of phenolphthalein solution, 13.5 grams (0.33 mol) of caustic soda, dissolved in 110 ml. of water (3 N alkali) are added dropwise at 5–10° C. during the course of 20–30 minutes. Towards the end of the addition of alkali, the reaction solution just remains alkaline to phenolphthalein. It is stirred for another 30 minutes at room temperature, the precipitated sodium sulfite is filtered off by suction from the solution, and the salts are washed with 250 ml. of benzene. The benzene layer of the filtrate is separated, washed neutral with water, dried with sodium sulfate, and distilled. 36 grams of the ester are obtained as the residue. $n_D^{22}$ 1.4958. Yield: 48% of the theoretical.

*Example 6*

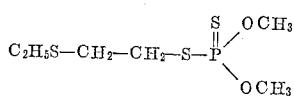

68 grams (0.3 mol) of the sodium salt of 2-ethylmercaptoethyl-thiosulfonic acid are dissolved in 150 ml. of methanol. 38 grams (0.3 mol) of dimethyl thiolphosphite and a few drops of phenolphthalein are added, and thereafter a solution of sodium methylate containing 0.33 mol of dissolved sodium is added dropwise at 5–10° C. The reaction product remains weakly red colored at the end. After stirring at room temperature for half an hour, water is added until the salts have dissolved. The separated oil is taken up in benzene, washed neutral with water, dried over sodium sulfate, and the solvent is distilled off. 60 grams of the ester are obtained. $n_D^{23}$ 1.5357. Yield 81.2% of the theoretical. The ester is an almost colorless oil insoluble in water.

*Example 6a*

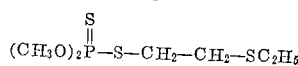

74 grams (0.33 mol) of the sodium salt of 2-ethylmercaptoethyl-thiosulfuric acid are dissolved in 150 cc. of water. After addition of 38 grams (0.3 mol) of O,O-dimethyl-thiolphosphorous acid, 42 grams of triethylamine are added dropwise to the resulting solution at 10–20° C. whereupon a strongly exothermic reaction sets in. Thereafter, the reaction mixture is stirred at room temperature for another half hour, the separated oil is then taken up in benzene, and the benzene solution is washed with water until there is a neutral reaction, dried over sodium sulfate, and distilled. After evaporation of the solvent, there is obtained the O,O-dimethyl-S-2-(ethylmercaptoethyl)-thionothiolphosphoric acid ester in the form of a colorless oil of B.P. 71° C./0.01 mm. Hg. $n_D^{20}$ 1.5484. Yield: 63 grams, corresponding to 85.4% of the theoretical.

*Example 7*

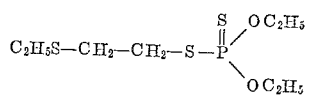

As was described in the previous Example 6, 68 grams (0.3 mol) of 2-ethylmercaptoethyl-thiosulfonic acid sodium salt in 150 ml. of methanol and 47 grams (0.3 mol) of diethyl thiolphosphite are brought to reaction with a solution of sodium ethylate containing 0.33 mol of dissolved sodium. After working up as usual, there are obtained 72 grams of the ester as a colorless, odorless oil. $n_D^{22}$ 1.5327. Yield: 87.8% of the theoretical.

*Example 8*

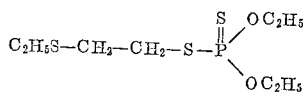

37.5 grams (0.3 mol) of 2-ethylmercaptoethyl chloride and 77.1 grams (0.31 mol) of sodium thiosulfate are warmed to 70° C. in 50 ml. of water and 50 ml. of alcohol for 10 minutes. Thereafter, it is cooled to 5–10° C., 46.2 grams (0.3 mol) of diethyl thiolphosphite and a few drops of phenolphthalein solution are added, and a solution of 13.5 grams (0.33 mol) of caustic soda in 110 ml. of water is added dropwise, with stirring, until there is a color change. After the addition of 250 ml. of benzene, sodium sulfite is filtered off by suction, the benzene solution is washed neutral, dried over sodium sulfate, and the solvent is distilled off. There are obtained 76 grams of the ester as a colorless and practically odorless oil. $n_D^{22}$ 1.5304. Yield 87.5% of the theoretical.

*Example 9*

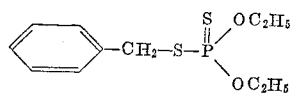

68 grams (0.3 mol) of benzyl-thiosulfonic acid sodium salt are suspended in 300 ml. of benzene. After the addition of 51 grams (0.33 mol) of diethyl thiolphosphite, the amount of sodium methylate corresponding to 0.33 mol of sodium is added dropwise at 25–30° C., with occasional cooling. The mixture is after-stirred for a short while, water is added, and it is separated. The benzene solution is washed neutral with water, dried over sodium sulfate, and distilled. B.P. 90° C./0.01 mm. Hg. Yield 61 grams (73% of the theoretical).

*Example 10*

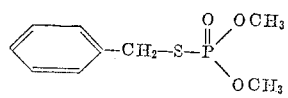

68 grams (0.3 mol) of benzyl-thiosulfonic acid sodium salt and 37 grams (0.33 mol) of dimethyl phosphite are dissolved in 150 ml. of methanol. The amount of sodium methylate corresponding to 0.33 mol of sodium is added dropwise at 5–10° C. The reaction is exothermic. After the addition of 300 ml. of benzene, the product is washed with water, dried over sodium sulfate, and distilled. B.P. 89° C./0.01 mm. Hg. Yield 31 grams of the new product (56.3% of the theoretical).

Calculated for molecular weight 232.2: S, 13.81%; P, 13.34%. Found: S, 13.84%; P, 13.29%.

*Example 11*

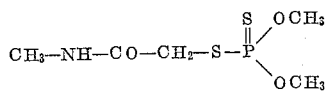

65 grams (0.3 mol) of the sodium salt of thiosulfonic acid methylacetamide (M.P. 100–102° C.) are dissolved in 200 ml. of water. After the addition of 38 grams (0.3 mol) of dimethyl thiolphosphite in 250 ml. of benzene and a few drops of phenolphthalein solution, the amout of 3 N sodium hydroxide solution corresponding to 0.33 mol is added dropwise at 5–10° C., by cooling with ice water, until the solution is no longer decolorized. It is separated and washed with water. The benzene solution is dried over sodium sulfate, and the solvent is distilled off. The distillation residue sets solid and it is triturated with ice cold petroleum ether. It is filtered off by suction and 35 grams of the ester are obtained with M.P. 52° C. Yield 50.8% of the theoretical.

*Example 11a*

$$CH_3-NH-CO-CH_2-S-\overset{S}{\overset{\|}{P}}-(OCH_3)_2$$

65 grams (0.3 mol) of sodium N-methylcarboxamidomethylthiosulfate are dissolved in 200 cc. of water. After the addition of 38 grams (0.3 mol) of O,O-dimethyl-thiolphosphorous acid, 42.5 grams (0.4 mol) of 95% triethylamine are added dropwise at 10–20° C., with external cooling, to the reaction mixture. Thereafter, the mixture is stirred for another ¼ hour, whereupon no discoloration of any kind occurs, then neutralized to a pH value of 6 at 10 to 15° C. with dilute hydrochloric acid, and a seed crystal is added if necessary; after cooling the reaction mixture to 0–10° C. the separated crystals are filtered off by suction, and the precipitate covered, on the filter funnel, with a little ice cold water. The product filtered off by suction and still containing inorganic salts is dissolved in methylene chloride. The insoluble components are filtered off by suction, and methylene chloride is evaporated from the filtrate. There remain 55 grams (80% of the theoretical) of the O,O-dimethyl - S - (N - methylcarboxamidomethyl) - thionothiolphosphoric acid ester in the form of colorless crystals of M.P. 45° C.

*Example 11b*

$$CH_3-NH-CO-CH_2-S-\overset{S}{\overset{\|}{P}}-(OCH_3)_2$$

A solution of 74.5 grams (0.3 mol) of sodium thiosulfate and 37.4 grams (0.3 mol) of monochloroacetic acid methyl amide in 75 cc. of water is heated to 70–80° C. for 15 minutes. Upon cooling the mixture, the sodium salt of N-methylcarboxamidomethyl thiosulfuric acid crystallizes out which is redissolved by the addition of 25 cc. of water. After the addition of 38 grams (0.3 mol) of O,O-dimethyl-thiolphosphorous acid, 42.5 grams (0.4 mol) of 95% triethylamine are added to the reaction mixture at 10 to 20° C. with external cooling whereby a discoloration takes place, and the mixture is then cooled to 0–10° C. after 15 minutes. The crystallized ester and the likewise separated inorganic salts are filtered off with suction and covered on the filter with ice-cold water. After drying of the precipitate, it is dissolved in methylene chloride, the undissolved inorganic salts are filtered off with suction, and the solvent is evaporated off from the filtrate. 55 grams (80% of the theoretical) of O,O-dimethyl - S - (N - methylcarboxamidomethyl) - thionothiolphosphoric acid ester are obtained in the form of a colorless crystalline powder of M.P. 45° C.

*Example 12*

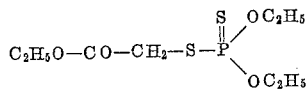

67 grams (0.3 mol) of the sodium salt of glycollic acid-ethyl ester-thiosulfate (Purgotti, G. 22 I, 424) are dissolved in 100 ml. of water. A solution of 47 grams (0.3 mol) of diethyl thiolphosphite in 200 ml. of benzene is allowed to run into this solution. After adding phenolphthalein as indicator, a solution of 13.5 grams (0.33 mol) of caustic soda in 110 ml. of water is added dropwise at 5–10° C., with cooling, until the solution is no longer decolorized. It is stirred at 5–10° C. for another 30 minutes, separated, and the benzene solution is washed until neutral, dried and distilled. B.P. 77° C./0.01 mm. Hg. A colorless, almost odorless oil, is obtained. Yield 43 grams (52.6% of the theoretical).

*Example 13*

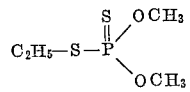

50 grams (0.3 mol) of ethyl-thiosulfonic acid sodium salt are dissolved in 100 ml. of water. 38 grams (0.3 mol) of dimethyl thiolphosphite are allowed to run into this solution, and a few drops of phenolphthalein solution are added. A solution of 14 grams (0.33 mol) of caustic soda in 110 ml. of water (3 N) is added dropwise at 5–10° C., while cooling, until there is a permanent red coloration. The oil is taken up in benzene, washed with water, dried over sodium sulfate, and distilled. B.P. 79° C./2 mm. Hg. Yield 55 grams (82.5% of the theoretical).

*Example 14*

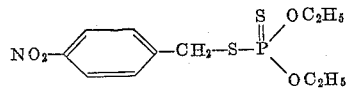

81 grams (0.3 mol) of 4-nitrobenzyl-thiosulfonic acid sodium salt (M.P. 176° C., Soc. 95, 1726) and 47 grams (0.3 mol) of diethyl thiolphosphite are suspended in 200 ml. of methanol; 0.33 mol of a 3 N sodium hydroxide solution (14 grams/110 ml. of water) are added dropwise at 5–10° C. with cooling. The mixture is stirred for another 10 minutes, water is added until the precipitated sodium sulfite has dissolved, and slight impurities are filtered off by suction. The oil is taken up in benzene, washed neutral with water, dried over sodium sulfate, and the solvent is distilled off. 88 grams of the ester are obtained as the residue. B.P. 152–153° C./0.01 mm. Hg. Reddish yellow oil. Yield 91.4% of the theoretical.

*Example 15*

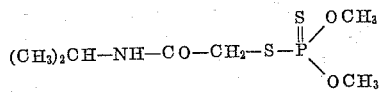

71 grams (0.3 mol) of the crude sodium salt of thiosulfonic acid isopropylacetamide are dissolved in 200 ml. of water. After addition of 38 grams (0.3 mol) of dimethyl thiolphosphite and a few drops of phenolphthalein solution, 0.3 mol of a 3 N sodium hydroxide solution (13.5 grams/110 ml. of water) are added dropwise at 5–10° C., with cooling, until there is a permanent red coloration. During this process, the ester already crystallizes as colorless, fine small needles. After further stirring for a short while at 5–10° C., it is filtered off by suction and washed with water. After drying, 51 grams of the novel ester are obtained. M.P. 77–78° C. Yield 66.2% of the theoretical.

*Example 15a*

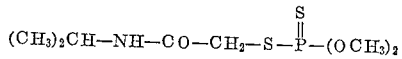

74.5 grams (0.3 mol) of sodium thiosulfate are dissolved together with 42.7 grams (0.3 mol) of monochloroacetic acid-isopropylamide in 200 cc. of water, and the mixture is warmed to 70–80° C. for 15 minutes. A homogeneous solution is already obtained within a short time, and this is cooled to 20° C. and treated with 38 grams (0.3 mol) of O,O-dimethyl-thiolphosphorous acid. Thereafter, 42.5 grams (0.4 mol) of triethylamine are added to the reaction mixture at a rate such that a temperature of 30° C. is not exceeded. After stirring for about one hour, a crystalline mass separates. The mixture is cooled to 0–10° C., neutralized with dilute hydrochloric acid to a pH value of 6, and the crystals are filtered off by suction and quickly rinsed with ice-cold water. The precipitate is dried, and thereafter dissolved in methylene chloride. After the inorganic salts have been filtered off by suction, the solvent is evaporated from the filtrate, and 63 grams (i.e. 81.7% of the theoretical) of the O,O-dimethyl - S - (N - isopropylcarboxymethyl) - thionothiolphosphoric acid ester of M.P. 78° C. are obtained.

*Example 16*

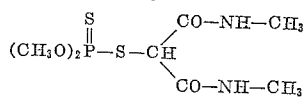

A solution of 44 grams (0.21 mol) of bromomalonic acid-bis-monomethylamide (M.P. 164° C., cf. J. V. Backen, R. W. West, and M. A. Whiteley, Journal of the Chemical Society, vol. 119 [1921, p. 365]) and 52 grams (0.24 mol) of sodium thiosulfate in 300 cc. of water is warmed to 70–80° C. for 15 minutes. Thereafter, the mixture is cooled to 10° C. treated first with 25.2 grams (0.2 mol) of O,O-dimethyl-thiolphosphorous acid, and then dropwise, at 10–20° C., whilst cooling, with 28.2 grams (0.27 mol) of 95% triethylamine. The O,O-dimethyl - S - (bis - N - methylcarboxamido) - methylthionothiolphosphoric acid ester already starts to crystallize during the dropwise addition of the triethylamine. To complete the reaction, the reaction mixture is stirred at room temperature for about another half an hour longer, the crystal mass is then filtered off by suction, the precipitate is washed with water, and dried in the air. The product is pure. M.P. 139° C. Yield 49 grams i.e. 86.2% of the theoretical.

*Analysis.*—$C_7H_{15}O_4N_2S_2P$: Calculated for molecular weight 286.3: N, 9.78%; S, 22.40%; P, 10.82%. Found: N, 9.80%; S, 22.19%; P, 10.46%.

Toxicity on rats per os ($LD_{50}$) amounts to 250 mg./kg.

*Example 17*

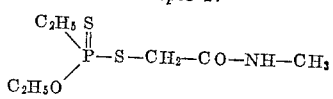

65 grams (0.3 mol) of the sodium salt of N-methylcarboxamidoethyl-thiosulfuric acid are dissolved in 200 cc. of water, and after the addition of 42 grams (0.3 mol) of ethyl-thiophosphonous acid-O-ethyl ester, this solution is treated dropwise at 10–15° C., whilst cooling, with 41 grams (0.45 mol) of 95% triethylamine. To complete the reaction, the mixture is stirred for another hour at 20° C. then neutralized to a pH value of 6, and the reaction product is now extracted with benzene. After drying the benzene solution over sodium sulfate and distilling of the solvent, the ethylthionothiolphosphonic acid-O-ethyl-S-(N-methylcarboxamidomethyl)-ester remains in the form of a colorless oil with $n_D^{20}$ 1.5474. Yield 55 grams, corresponding to 72% of the theoretical.

*Example 18*

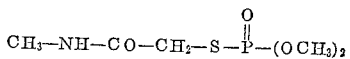

A solution of 104 grams (0.5 mol) of the sodium salt of N-methylcarboxamidomethyl-thiosulfuric acid in 104 cc. of water is cooled to 10° C. Thereafter, 66 grams (0.6 mol) of O,O-dimethylphosphorous acid are quickly added at this temperature to the reaction mixture, and thereupon 74 grams (0.7 mol) of 95% triethylamine are added dropwise at 10–15° C., whilst cooling. After stirring at room temperature for three hours, the mixture is neutralized with dilute hydrochloric acid to a pH value of 6, and the separated mass of salts is filtered off by suction. The filtrate is extracted by portions with 500 cc. of methylene chloride, and after drying the methylene chloride solution over sodium sulfate, the solvent is distilled off. There remain 72 grams (67.6% of the theoretical) of O,O-dimethyl-S-(N-methylcarboxamidomethyl)-thiolphosphoric acid ester as a colorless, viscous water-soluble oil.

*Example 19*

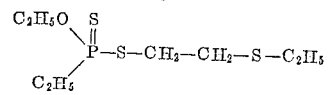

68 grams (0.3 mole) of 2-ethylmercaptoethyl-thiosulfonic acid sodium salt are dissolved in 150 ml. of methanol. 42 grams (0.3 mol) of O-ethyl-thiolethylphosphonous acid (B.P. 3 mm./58° C.) are reacted with a solution of sodium ethylate which contains 0.33 mol of dissolved sodium. The second solution is slowly added with cooling to the first solution at about 5–10° C. After the addition of about 1 litre of water (until the separated salt has dissolved), the separated oil is taken up in benzene, the benzene solution is washed with water, dried over $Na_2SO_4$ after the water has been separated, and the solvent is finally distilled off in vacuo. There is obtained a colorless and almost odorless oil of B.P. 82° C./0.01 mm. Hg. The yield amounts to 72.5% of the theoretical.

*Example 20*

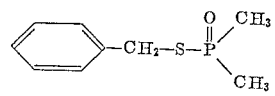

68 grams (0.3 mol) of sodium benzylthiosulfate and 27 grams (0.33 mol) of dimethyl-phosphinous acid are dissolved in 150 ml. of methanol. A solution of sodium methylate corresponding to a content of 0.33 mol of sodium is added dropwise at 5 to 10° C. The reaction mixture is diluted with benzene and then washed neutral with water. After drying over sodium sulfate, the residue is distilled in vacuo. There are obtained 17 grams of the above ester, with B.P. 82° C./0.01 mm. Hg.

*Example 21*

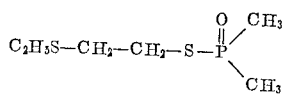

After the addition of 25 grams (0.32 mol) of dimethylphosphinous acid (B.P. 42° C./1 mm. Hg), 13.5 grams of caustic soda (0.33 mol) dissolved in 100 cc. of water are added dropwise at 5–10° C. to a solution of 68 grams (0.3 mol) of sodium 2-ethylmercapto-ethyl-thiosulfate in 150 ml. of water. After the addition has been completed, the reaction mixture is stirred at room temperature for another 30 minutes, the salts formed are then filtered off by suction, and rinsed with 250 ml. of benzene. The benzene solution is separated, dried with sodium sulfate, and fractionally distilled. By this method, there are obtained 55 grams (89% of the theoretical) of dimethylthiolphosphinic acid-S-(β-ethylmercaptoethyl)-ester of B.P. 83° C./0.01 mm. Hg.

We claim:
1. A process for the production of a compound of the general formula

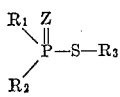

in which Z is a chalcogen having an atomic number from 6 to 18, $R_1$ and $R_2$ are selected from the group consisting of lower alkyl and lower alkoxy and $R_3$ is a member of the group consisting of lower alkyl, benzyl, nitrobenzyl, alkylmercaptoalkyl, alkylamidocarbonylalkyl and alkoxycarbonylalkyl, which comprises reacting an alkali salt of a thiono-phosphorus acid of the formula

in which $R_1$ and $R_2$ have the same meaning as given above and X is an alkali-forming group selected from the group consisting of sodium, potassium and ammonium with a compound of the formula

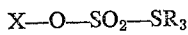

$$X-O-SO_2-SR_3$$

in which X and $R_3$ have the same meaning as stated above.

2. The process of claim 1 wherein $R_1$ and $R_2$ are each lower alkoxy.
3. The process of claim 1 wherein $R_1$ and $R_2$ are each lower alkyl.
4. The process of claim 1 wherein $R_1$ is lower alkoxy and $R_2$ is lower alkyl.
5. A process for the production of a compound of the general formula

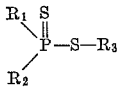

in which $R_1$ and $R_2$ are selected from the group consisting of lower alkyl and lower alkoxy and $R_3$ is a member of the group consisting of lower alkyl, benzyl, nitrobenzyl, alkylmercaptoalkyl, alkylamidocarbonylalkyl and alkoxycarbonylalkyl, which comprises reacting an alkali salt of a thiono-phosphorus acid of the formula

in which $R_1$ and $R_2$ have the same meaning as given above and X is an alkali-forming group selected from the group consisting of sodium, potassium and ammonium with a compound of the formula

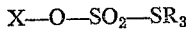

$$X-O-SO_2-SR_3$$

in which X and $R_3$ have the same meaning as stated above.

6. The process of claim 1 wherein the alkali salt of a phosphorus acid is formed in situ by reacting the corresponding thiono-phosphorus acid with a member selected from the group consisting of sodium methylate, sodium ethylate, sodium hydroxide and triethylamine.

7. The process of claim 1 in which the reaction is carried out in a solvent selected from the group consisting of an aliphatic alcohol and water.

8. The process of claim 6 in which the reaction is carried out in a solvent selected from the group consisting of an aliphatic alcohol and water.

9. A process for the production of a compound of the general formula

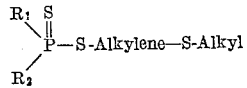

in which $R_1$ and $R_2$ are each selected from the group consisting of lower alkyl and lower alkoxy, which comprises reacting an alkali salt of a compound of the formula

in which $R_1$ and $R_2$ have the same meaning as given above and X is an alkali forming group selected from the group consisting of sodium, potassium and ammonium with a compound of the formula

$$X-O-SO_2-S-Alkylene-S-Alkyl$$

in which X has the same meaning as given above.

10. A process for the production of a compound of the general formula

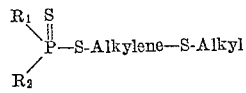

in which $R_1$ and $R_2$ are each selected from the group consisting of lower alkyl and lower alkoxy, which comprises reacting an alkali salt of a compound of the formula

in which $R_1$ and $R_2$ have the same meaning as given above and X is an alkali forming group selected from the group consisting of sodium, potassium and ammonium with a compound of the formula

$$X-O-SO_2-S-Alkylene-S-Alkyl$$

in which X has the same meaning as given above.

References Cited in the file of this patent

Michalski et al.: "J. Chem. Soc." (April 1960), pp. 1665–1670.